W. O. STRONG.
Egg-Carriers.

No. 152,432.            Patented June 23, 1874.

WITNESSES.           INVENTOR.

*G. Mathys*           *Wm. O. Strong*

BY

ATTORNEYS.

UNITED STATES PATENT OFFICE.

WILLIAM O. STRONG, OF YPSILANTI, MICHIGAN.

IMPROVEMENT IN EGG-CARRIERS.

Specification forming part of Letters Patent No. 152,432, dated June 23, 1874; application filed March 18, 1874.

*To all whom it may concern:*

Be it known that I, WILLIAM O. STRONG, of Ypsilanti, in the county of Washtenaw and State of Michigan, have invented a new and Improved Egg-Carrier; and I do hereby declare that the following is a full, clear, and exact description of the same, reference being had to the accompanying drawing forming a part of this specification, in which—

Figure 1:
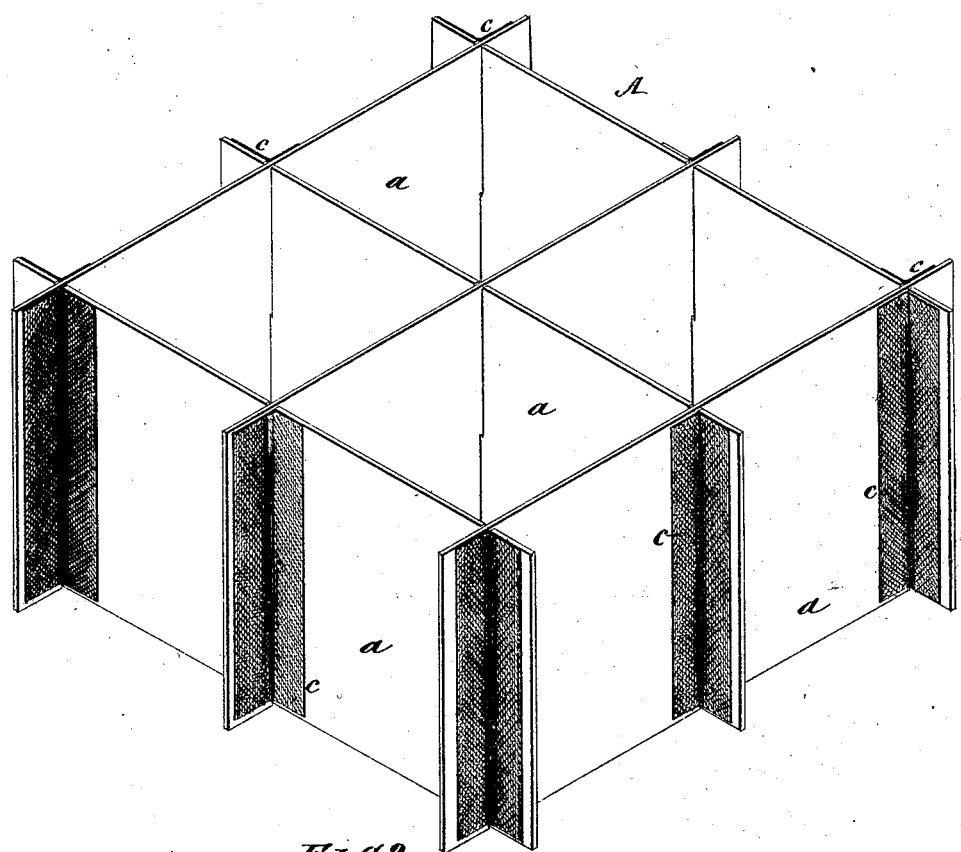
Figure 2:
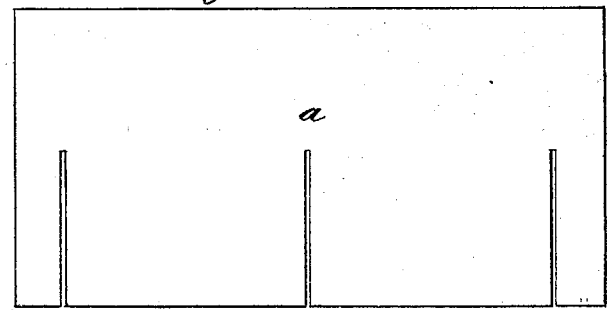

Figure 1 is a perspective view of the carrier. Fig. 2 is a plan of one of the strips.

Egg-carriers formed of slitted and interlocked paper strips soon become useless in consequence of the projecting ends of the strips being broken; and when the slits of each strip are on one side thereof, instead of being alternately arranged, it is impossible to raise the carriers from the trays in which they rest without disconnecting all or part of the strips.

To remedy these and other defects, I connect the projecting ends to the side of the adjacent or exterior cross-strip by means of linen, muslin, or other suitable fabric, as hereinafter described.

Referring to the drawing, the carrier A is represented as formed of a series of paper strips, $a$, each of which is slitted vertically on one edge, to adapt them to be crossed and interlocked in the usual manner. The ends of the several strips project beyond the outer strips forming the sides of the carrier, and are thus subjected to most wear in practical use, since they are always in frictional contact with the sides of the tray or box containing the carrier, and form a cushion to break the effect of jars, concussions, &c., on the sides of the box. To prevent injury to the ends of the strips from this cause, and to firmly connect the strips together, so that the carrier may be raised out of the box or otherwise adjusted by taking hold of any of the central strips, I paste narrow pieces of fabric $c$ to the sides of the projecting ends and to the contiguous portion of the outer strip.

This connection does not prevent the carrier being folded or compressed, but rather forms a strong hinge, on which the strips may turn without danger of breaking off the end portion. It also adds little to the cost of the carrier, although greatly increasing its durability, and adapting it to be conveniently and safely handled.

What I claim is—

The combination, with the crossed and interlocked strips $b$, each slitted on one edge only, of the pieces of fabric $c$, applied to the projecting ends and sides of the strips, as shown and described, for holding the strips together and protecting their ends, as set forth.

WM. O. STRONG.

Witnesses:
J. WILLARD BABBITT,
RICHARD J. STUCK.